J. R. SMITH.
VEHICLE WHEEL.
APPLICATION FILED OCT. 29, 1913.
1,215,885.
Patented Feb. 13, 1917.
2 SHEETS—SHEET 1.
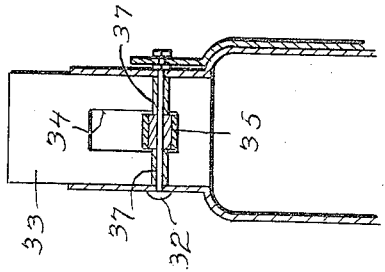
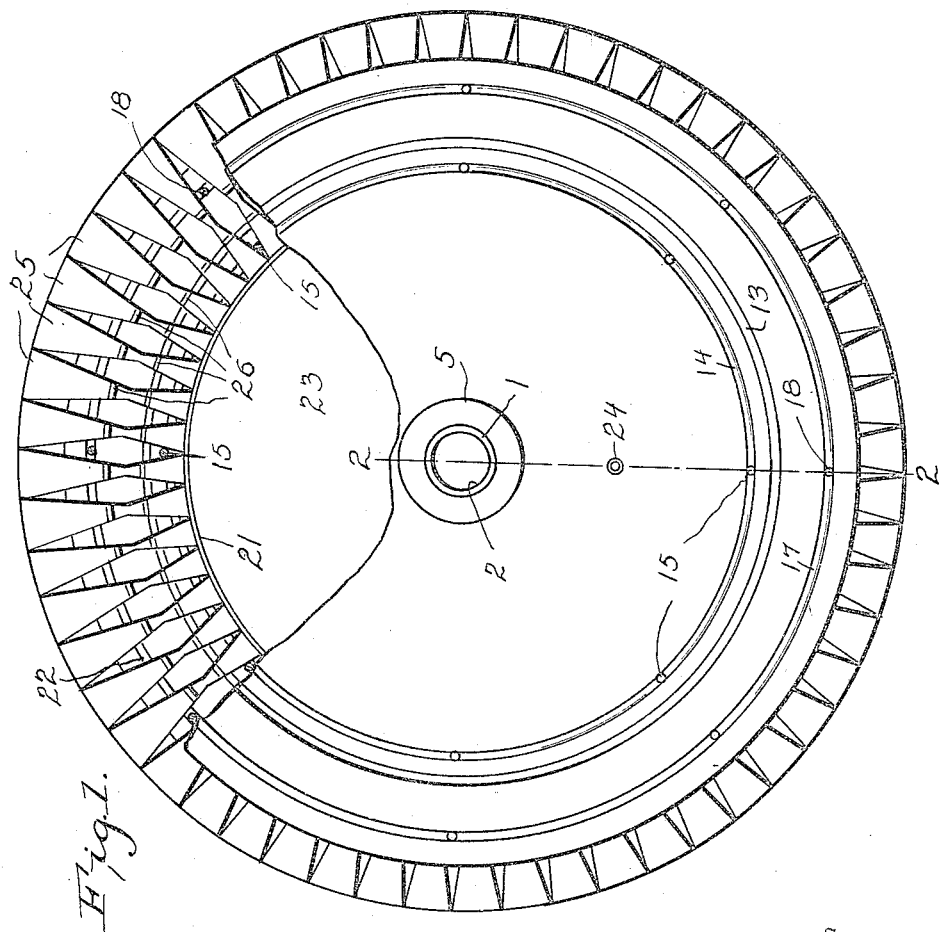

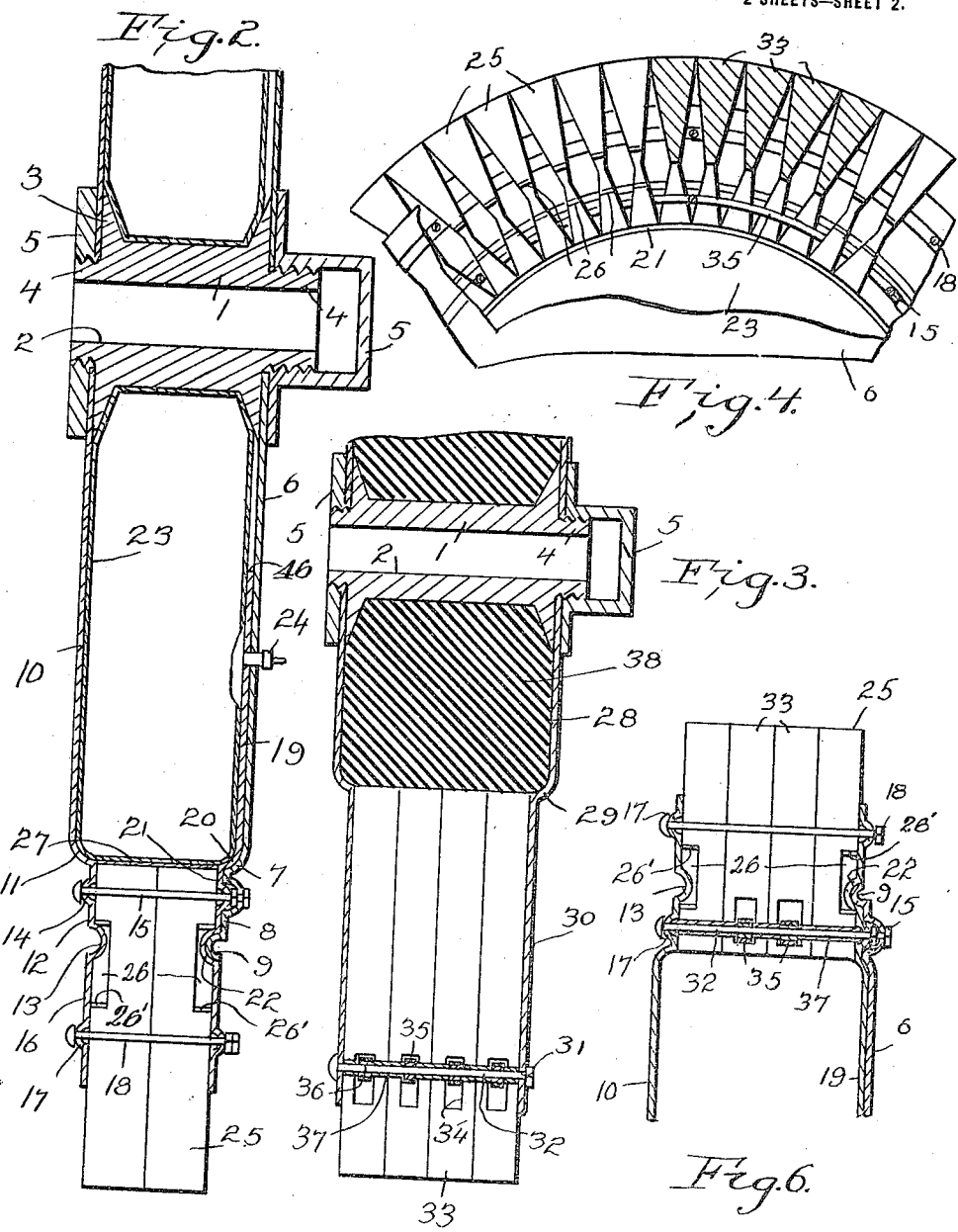

UNITED STATES PATENT OFFICE.

JOHN R. SMITH, OF LONDON, ENGLAND.

VEHICLE-WHEEL.

1,215,885.	Specification of Letters Patent.	Patented Feb. 13, 1917.

Application filed October 29, 1913. Serial No. 797,935.

*To all whom it may concern:*

Be it known that I, JOHN ROBERT SMITH, a subject of the King of Great Britain, residing at London, E. C., England, have invented certain new and useful Improvements in Vehicle-Wheels; and I do hereby declare the following to be a full, clear, and exact description of the invention, such as will enable others skilled in the art to which it appertains to make and use the same.

This invention relates to new and useful improvements in vehicle wheels and has for its object the provision of a wheel of the above character which is adapted to eliminate the use of pneumatic tires.

Another object of my invention is the provision of a novel means to provide for the resiliency necessary in the use of vehicle wheels which are designed to eliminate the pneumatic tire.

A further object of my invention is the provision of a novel tire structure which will present to the surface of the ground a substantially continuous rim which is adapted to receive all the shocks caused by the unevenness of the road way.

Still another object of my invention is the provision of a novel means for supporting the tire sections within the wheel and still maintain the same in operative position.

With the above and other objects in view I will now proceed to describe my invention in the following specification and accompanying drawings, in which—

Figure 1 is a side view of a vehicle wheel constructed in accordance with my improved construction having two circular series of tire sections showing part of the casing broken away to more fully disclose the interior mechanism, Fig. 2 is an enlarged detail sectional view taken on line 2—2 of Fig. 1, Fig. 3 is an enlarged detail sectional view similar to Fig. 2, showing a wheel having four circular series of tire sections, Fig. 4 is a detail view of a segment of the wheel showing a modified form thereof, the cover plate being broken away to show the interior mechanism and a portion of the interior tire sections being in section to disclose the interior mechanism of the tire sections.

Fig. 5 is an enlarged detail sectional view of a wheel having one circular series of tire sections, Fig. 6 is a detail sectional view of the form shown in Fig. 4.

Referring to the drawings by characters of reference, 1 indicates the hub of an ordinary wheel having extending therethrough the aperture 2 for the reception of the end of the axle. Formed integral with the hub and extending outwardly therefrom adjacent each end I preferably provide the annular flanges 3 which are adapted to form the abutment against which the plates 6 and 10 are adapted to rest.

These flanges also form the inner terminus of the extensions 4 which are provided with screw threads with which the nuts 5 are adapted to coöperate. The cover plates above referred to one of which is detachable which are indicated by the numeral 6 are preferably in the form of disks and are bent inwardly adjacent their outer terminals as shown at 7. These plates are again bent as clearly illustrated to form the annular extensions 8 which terminate at their outer extremities in the bead 9 the use of which will be more fully hereinafter described. A plate 10 similar to the plate 6 is provided at its outer edge with the inwardly extending portion 11 which is bent as shown and forms the extension 12 which is provided adjacent its outer extremity with the inwardly extending bead 13. Intermediate the inner and outer extremities of the extension 12 I preferably provide the outwardly extending bead 14 through which the bolt 15 is adapted to extend. A bead similar to this and in the same position is provided on plates 6 and 19, bolt 15 having two nuts one securing plate 19 and the other the detachable cover plate 6. Extending outwardly from the bead 13 on the same plane as the extension 12 I also provide an extension 16 which is provided with the annular rib 17 through which the bolt 18 is adapted to extend.

A suitable plate 19 which is bent inwardly as shown at 20 is provided and has formed integral with the periphery thereof the annular extension 21 which terminates at its outer extremity with the inwardly extending annular bead 22 which corresponds in every way to the bead 13 formed on the plate 10. The remaining portion of the plate 19 beyond the bead 22 corresponds in every feature to the portions 16 and 17 formed on the plate 10. This plate 19 terminates at 46, leaving a space between itself and the hub through which air bag 23 is inserted or detached, after plate 6 is taken off. A suitable air tight bag 23 is held between the plates 6 and 10 respectively and is adapted to be inflated through the valve 24. This bag is adapted to act as the inner abutment for the tire sections 25. These sections 25 preferably comprise the members which are clearly illustrated in Fig. 4 and are provided with the lateral recesses 26 the ends of which are protected by means of a rubber cushion or buffer 26' which is adapted to eliminate noise due to the recoil of the tire sections. A suitable canvas band 27 is provided and is adapted to surround the periphery of the bag 23 and protect the same from undue wear owing to the action of the tire sections against the outside thereof.

In the modified form of my invention which I have shown in Fig. 3 I preferably provide the plates 28 which are adapted to be clamped between the flanges 3 and the nuts 5 in a manner similar to the modification previously described. These plates extend parallel to each other as illustrated for a portion of their distance and are bent inwardly as shown at 29 to form the annular chamber in which the cushioning member is adapted to rest. These plates are then extended as illustrated at 30 to form the annular chamber in which the tire sections are slidably mounted. A suitable set of apertures 31 are located near the periphery of the plates 28 and are adapted to receive the bolts 32 the use of which will be hereinafter more fully described.

The tire sections 33 which are used in connection with my modified form of my improved wheel are preferably of the form illustrated in Figs. 3 and 5. These tire sections are provided near their outer ends with suitable apertures 34 through which a rubber cased metallic band or cushioning member 35 having the apertures 36 therethrough is adapted to extend. These bands 35 are spaced from each other by means of the spacers 37 and are held in position through the medium of the bolts 32 previously described. Thus it will be seen that the tire sections will be permitted to move freely in a radial direction but lateral displacement of the same will be prevented.

A suitable cushion 38 of rubber or other resilient material is clamped between the chamber formed by the plates 28 and is adapted to act as the inner abutment for the ends of the tire sections 33 as will be clearly seen with reference to Fig. 3 of the drawings.

A further modification of my improved wheel is illustrated in Fig. 5 in which the support for the tire section is substantially the same as that described in the previous paragraph. In this form the structure is essentially as that illustrated in Fig. 3 with the exception that a single circular series of tire sections is provided instead of a plurality of circular series of tire sections and the beads 13 in the plate are eliminated.

In Fig. 6 of the drawings I have shown a still further modification of my invention in which I combine the features of the construction originally described and the construction described in the second modification, thus providing a means to use the first mentioned construction in combination with a wheel made up on a series of tire sections extending across the tread thereof. In this construction it is quite apparent that the bead 13 engages in the recess 26 of the outermost tire section 25 while the innermost tire sections are held against radial displacement by means of the bolts 32 which carry the cushioning members 35 which in turn engage in the chambers formed in the tire section. It will thus be seen that all of the tire sections will be held against radial displacement and any accident to the wheel will be eliminated.

It will be obvious from the foregoing that in use my improved wheel is mounted upon the axle in the usual manner and the air chamber 23 inflated thus causing each of the tire sections to be forced outwardly to its fullest extent and thereby bring the tread portions thereof in direct alinement thus forming the tread of the wheel. Should the wheel at any time strike an uneven place in the roadway it will be apparent that the individual tire sections coming in contact with the unevenness will be pressed inwardly against the air pressure and the shock will be absorbed. Owing to the pressure at the inner extremities of the tire sections it will be apparent that the tire sections will again be forced outwardly as soon as the obstruction is passed and the wheel will again assume its normal position. Owing to the buffers 26' which are carried by the tire sections it will be apparent that any noise resulting from the recoil of the tire sections against the bead 22 will be eliminated and the wheel will be rendered substantially silent in its operation. In using the modified form of my invention it will be apparent that the same is placed on the axle in the usual manner and owing to the fact that the cushion 38 is of solid material it will be obvious that the tire sections will normally be held in their extended position but should the wheel at any time strike an object in the roadway it will be apparent that the tire section against which the object presses will be forced inwardly against the cushion and owing to the fact that the cushion member is of the resilient material most of the shock caused by the contact with the object will be absorbed and a particularly easy riding wheel will thus be provided.

While in the foregoing I have shown and described the preferred embodiments of my invention I wish it to be understood that I may make such changes in combination and arrangement of parts as may fall within the scope of the claims without departing from the spirit of my invention.

What is claimed is:—

1. A resilient wheel comprising a hub, circular plates secured to the opposite ends of hte hub, a cushion arranged between the plates, a plurality of independently movable tire sections slidably mounted between said plates and engaging the cushion, the adjacent edges of the outer ends of said tire sections being normally engaged to provide a continuous tread surface, and the adjacent side faces of the sections being formed with substantially V-shaped recesses permitting independent movement thereof and providing chambers between the sections, means extending through the chambers and connecting the plates to prevent any circumferential movement of said sections, and means to limit the inward and outward movement of said sections.

2. A resilient wheel comprising a hub, circular plates secured to the opposite ends of the hub, a cushion arranged between the plates, a plurality of independently movable tire sections slidably mounted between said plates and engaging the cushion, the adjacent edges of the outer ends of said tire sections being normally engaged to provide a continuous tread surface, and the adjacent side faces of the sections being formed with substantially V-shaped recesses permitting independent movement thereof and providing chambers, means extending through the chambers and connecting the plates to prevent any circumferential movement of said sections, said tire sections having recesses formed in their side faces adjacent said plates, and inwardly projecting circular beads formed on said plates and extending into said recesses, whereby the inward and outward movement of said tire sections is limited.

In testimony whereof I affix my signature in presence of two witnesses.

JOHN R. SMITH.

Witnesses:
C. REEVES,
JOHN B. BOWYER.

Copies of this patent may be obtained for five cents each, by addressing the "Commissioner of Patents, Washington, D. C."